UNITED STATES PATENT OFFICE.

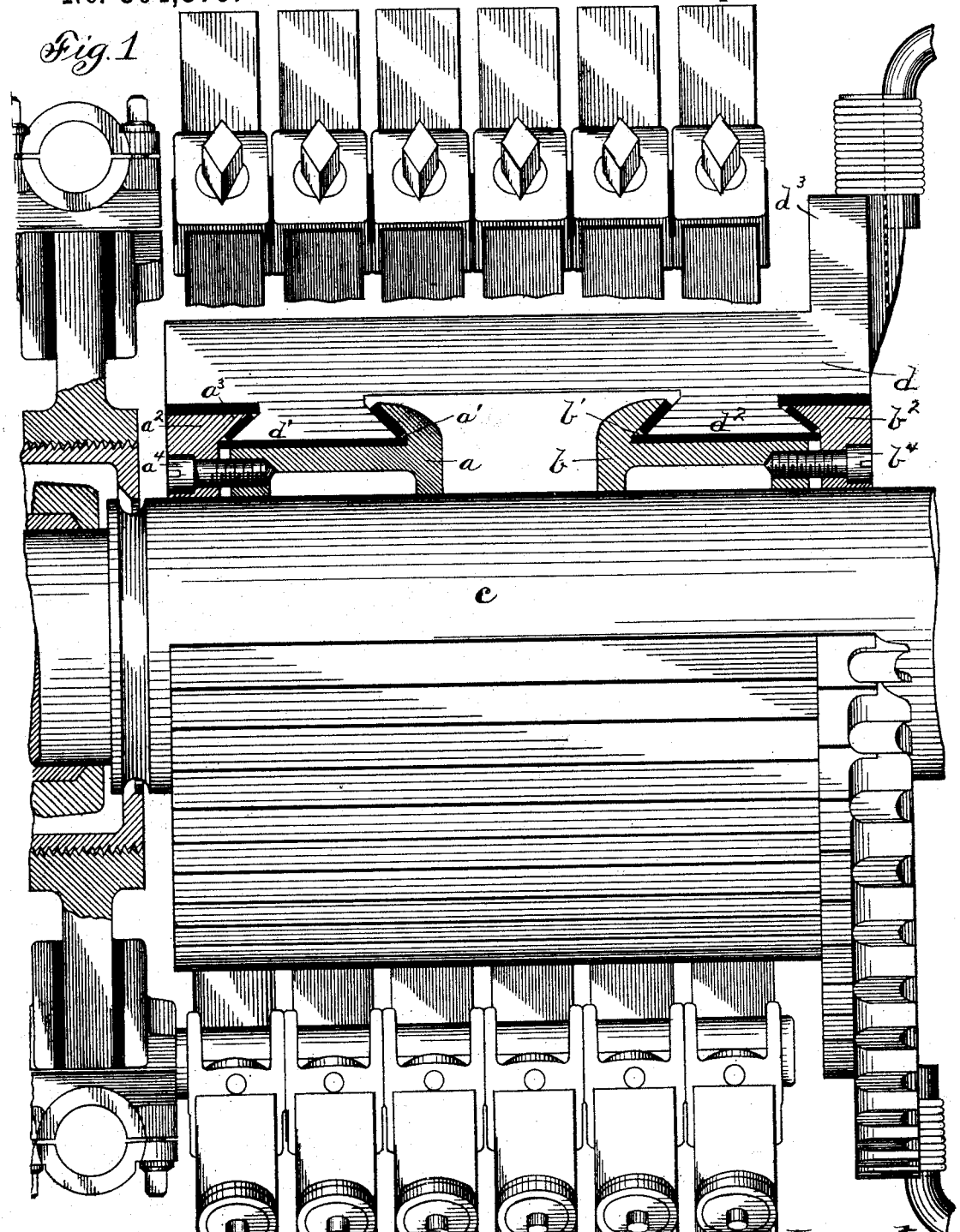

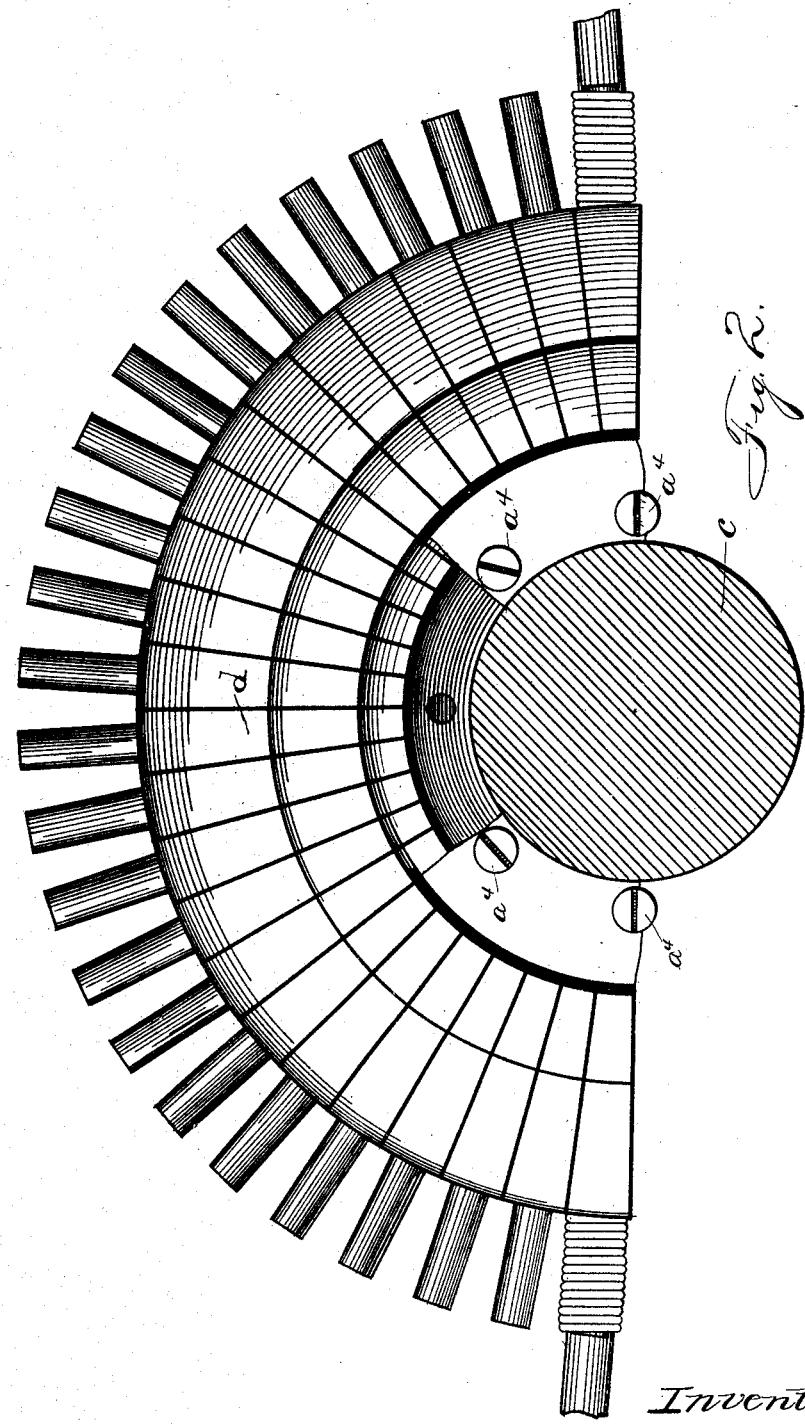

ERNEST P. WARNER, OF CHICAGO, ILLINOIS, ASSIGNOR TO THE WESTERN ELECTRIC COMPANY, OF SAME PLACE.

COMMUTATOR FOR DYNAMO-ELECTRIC MACHINES.

SPECIFICATION forming part of Letters Patent No. 504,379, dated September 5, 1893.

Application filed November 1, 1892. Serial No. 450,600. (No model.)

*To all whom it may concern:*

Be it known that I, ERNEST P. WARNER, a citizen of the United States, residing at Chicago, in the county of Cook and State of Illinois, have invented a certain new and useful Improvement in Commutators for Dynamo-Electric Machines, (Case No. 54,) of which the following is a full, clear, concise, and exact description, reference being had to the accompanying drawings, forming a part of this specification.

My invention relates to a commutator for dynamo electric machines, and its object is to provide a cylindrical commutator that will not be thrown out of shape or truth by changes in temperature.

My invention consists in providing two supports for the commutator bars located at or near the ends thereof, and in having these supports so mounted upon the shaft as to be free to move longitudinally and independently of each other.

My invention is particularly adapted for the construction of commutators for machines of a large current output in which the diameter of the commutator is limited and, consequently, the width of the commutator bar, and as the thickness of the brush is dependent upon the width of the commutator bar it becomes necessary to provide the required carrying capacity of the brushes by using brushes of considerable width, or by using a number of small brushes placed side by side. In either case the commutator bars must be made long and, when rigidly supported as they usually are at the ends, the heating of the bars causes an expansion and a consequent bending, which bending most frequently causes the commutator to assume a barrel shape and frequently results in considerable irregularity of the surface of the commutator, particularly at the center of its length. The frequent expansion and contraction tend, owing to the great compression exerted on the insulating material at the ends during the time the bars are expanded, to leave the bars loose whenever the commutator is cooled, so that as the armature rotates the bars will first be thrown out by centrifugal force and then pressed in by the collecting brushes as they pass under them. This action soon results in a rough uneven surface on the face of the commutator.

In carrying out my invention I provide sleeves upon the armature shaft which are mounted loosely thereon, and to which are attached the ends of the commutator bars. The connections between the bars and their respective coils upon the armature serve to hold the commutator against rotation upon the armature shaft, while the loose sleeves, carrying the ends of the commutator bars slide freely back and forth upon the shaft, thus permitting changes in the length of the bar due to the changes of temperature thereof.

My invention will be more readily understood by reference to the accompanying drawings, in which—

Figure 1 is a view, partly in section, of a commutator embodying my invention. Fig. 2 is a partial end view thereof.

Like letters refer to like parts in both of the figures.

Sleeves $a$ $b$ provided with annular grooves $a'$ $b'$ are adapted to fit loosely upon the armature shaft $c$. I preferably make each of these sleeves in two parts, the main part $a$ carrying two faces of the annular groove the side face of which is oblique, while the part $a^2$ is in the form of a plate carrying the annular ridge $a^3$, the inner face of which forms the third face of the annular groove. This plate is provided with holes for the insertion of the screws $a^4$, which are adapted to screw into threaded holes in the main part $a$, thus enabling adjustment of the width of the annular groove. The commutator bar $d$ is provided with two projections or feet $d'$ $d^2$, one near each end, which taper toward the top and which are adapted to be inserted in the annular grooves in the sleeves $a$ $b$. The sleeve having been placed upon the shaft the feet $d'$ $d^2$ of the commutator bars are placed in the annular grooves with insulating material separating them from the metallic sleeves, the insulating material being represented by the black shaded portions in the drawings. Insulating material is also placed between the different bars and when all of the bars have been placed in position the plates $a^2$ and $b^2$ are caused to press against the inclined surfaces of the feet by screwing up the screws $a^4$ and $b^4$. The commutator bars may be attached to the armature coils in any of the well known ways. I have shown this connection as made after the manner of my invention as described in Letters Patent No. 483,729, granted to me October 4, 1892. The connection between the commutator bars and the armature coils will be of a somewhat rigid character so that the commutator will be prevented thereby from rotating upon the armature shaft, and as this rigidity of connection will tend to cause the sleeve $b$ to maintain a more or less fixed position the change in length of the commutator bar will be permitted by the sliding of the sleeve $a$ upon the shaft.

For some purposes, and for some methods of connection between the commutator bars and the armature coils which do not afford such a rigid construction as that referred to, the sleeve $b$, or in fact either sleeve, may be shrunk upon or keyed to the shaft so that it may maintain an absolutely fixed position, in which case the sliding of the other upon the shaft will permit expansion and contraction of the commutator bars; or the sleeves, one or both, may be splined upon the shaft. I have not deemed it necessary to show these features by separate drawings as their use for the purpose is obvious.

It is evident that the device as illustrated is susceptible of many changes in matter of detail, and I therefore do not wish to be limited to the mere construction shown.

Having described my invention, what I claim as new, and desire to secure by Letters Patent, is—

1. In a dynamo electric machine, the combination with a shaft, of sleeves thereon, one or more of which is free to move longitudinally, and commutator bars supported by said sleeves, substantially as described.

2. A commutator composed of bars mounted upon sleeves, one or more of which is free to move longitudinally along the axis of rotation, substantially as described.

3. The combination with a shaft, of sleeves thereon, one or more of which is free to move longitudinally, commutator bars each supported at or near its ends by said sleeves, and collecting brushes bearing upon said commutator bars, substantially as described.

4. The combination with a shaft, of sleeves thereon, one or more of which is free to move longitudinally, said sleeves being provided with annular grooves upon their peripheries, and commutator bars provided with feet adapted to be held in said grooves, substantially as described.

5. In a commutator of a dynamo electric machine, the combination with a shaft, of sleeves fitting loosely thereon, commutator bars attached by their ends to said sleeves, and a rigid connection between said commutator bars and the coils of the armature, substantially as described.

6. The combination with a shaft, of the sleeves thereon, one or more of which is free to move longitudinally, said sleeves being provided with annular grooves having oblique sides, commutator bars provided with upwardly tapering feet adapted to be held in said grooves, substantially as described.

7. The combination with a shaft, of sleeves thereon, one or more of which is free to move longitudinally, said sleeves being provided with annular grooves and composed of two parts, whereby feet provided upon the commutator bars and resting in said grooves may be clamped and held, and said commutator bars, substantially as described.

8. In a commutator of a dynamo electric machine, the combination with the shaft $c$, of the sleeves $a$ and $b$ provided with the tapering grooves $a'$ and $b'$ respectively, said sleeves being free to move longitudinally upon said shaft, commutator bar $d$ provided with tapering feet $d'$ and $d^2$ adapted to be clamped in said grooves, and the rigid connection between said commutator bars and the coils of the armature, substantially as described.

9. The combination with a shaft, of two or more independently movable supports for the bars of a commutator, and to which said bars are secured; whereby freedom of expansion and contraction for said bars is permitted, substantially as and for the purpose set forth.

In witness whereof I hereunto subscribe my name this 25th day of October, A. D. 1892.

ERNEST P. WARNER.

Witnesses:
CHARLES A. BROWN,
W. CLYDE JONES.